United States Patent
Kawauchi et al.

(10) Patent No.: US 7,429,998 B2
(45) Date of Patent: Sep. 30, 2008

(54) METHOD AND APPARATUS FOR MONITORING VEHICLE REAR, AND SIGNAL PROCESSOR

(75) Inventors: Ryota Kawauchi, Tokyo (JP); Hirotaka Iwano, Tokyo (JP); Noriyuki Satoh, Tokyo (JP); Toru Ohki, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 599 days.

(21) Appl. No.: 10/253,526

(22) Filed: Sep. 25, 2002

(65) Prior Publication Data

US 2003/0058338 A1    Mar. 27, 2003

(30) Foreign Application Priority Data

Sep. 26, 2001    (JP)    ............... 2001-293520

(51) Int. Cl.
*H04N 7/18*    (2006.01)
(52) U.S. Cl. ................. 348/148; 348/61; 348/143
(58) Field of Classification Search ........... 348/148, 348/143, 61, 65; 340/937; 701/200
See application file for complete search history.

(56) References Cited

U.S. PATENT DOCUMENTS 5,680,123 A * 10/1997 Lee ............... 340/937
6,314,364 B1 * 11/2001 Nakamura ............. 701/200
6,636,254 B1 * 10/2003 Onishi et al. ........... 348/65

FOREIGN PATENT DOCUMENTS

| DE | 3813083 A1 | 11/1989 |
|---|---|---|
| DE | 198 16 054 A1 | 10/1998 |
| EP | 1 005 234 A2 | 5/2000 |
| EP | 1 065 642 A2 | 1/2001 |
| EP | 1 123 844 A1 | 8/2001 |
| EP | 1 253 065 A2 | 10/2002 |
| JP | 3-99952 | 4/1991 |
| JP | 10-257482 * | 9/1998 |
| JP | 2002-84456 | 5/2002 |

* cited by examiner

*Primary Examiner*—Allen Wong
(74) *Attorney, Agent, or Firm*—Morgan, Lewis & Bockius LLP

(57) ABSTRACT

Disclosed is a method for monitoring a vehicle rear which permits a user to grasp the position of the vehicle concerned easily without a sense of incongruity even in the case where plural display modes on a monitor are provided and switched from one to another.

The vehicle rear monitoring method comprises displaying a vehicle on one side of a monitor and displaying a rear image of the vehicle on an opposite side of the monitor, and displaying the vehicle on the opposite side of the monitor and displaying the rear image of the vehicle on the one side of the monitor, and switching from said one display to said other display on the monitor.

4 Claims, 3 Drawing Sheets

METHOD AND APPARATUS FOR MONITORING VEHICLE REAR, AND SIGNAL PROCESSOR

BACKGROUND OF THE INVENTION

1. Field of the Invention

The present invention relates to a method and an apparatus for monitoring a vehicle rear which perform an image processing for a vehicle rear image picked up by a camera mounted on a vehicle and which displays the thus-processed image on a monitor, as well as a signal processor used in the vehicle rear monitoring apparatus.

2. Description of the Prior Art

Heretofore there has been known a vehicle rear monitoring apparatus which, for the purpose of improving the safety of vehicle operation and assisting a vehicular parking operation, photographs a road surface and the vicinity of a vehicle with use of a single camera mounted on a rear portion of the vehicle and which reverses the picked-up image right and left and then displays it on a monitor.

As an apparatus which applies an image processing to images inputted from plural cameras to reproduce a sense of distance there is known, for example, a vehicle rear monitoring apparatus disclosed in Japanese Patent Publication No. Hei 3 (1991)-99952. In this vehicle rear monitoring apparatus, an image processing is performed for an image picked up by a camera which faces the rear of the vehicle concerned, to effect a change of visual point (perspective change), and a vehicle rear image is displayed on a monitor in a form such that the vehicle concerned is looked down from a virtual visual point positioned substantially just above the vehicle concerned (the visual field from the virtual visual point will hereinafter be referred to as a "top visual field") (see FIG. 3 in the above publication).

If such an image conversion method as disclosed in Japanese Patent Application No. 2000-271281 is applied to the aforementioned image processing, then by using a virtual visual point having such an angle of depression as looking down obliquely (the visual field from the said virtual visual point will hereinafter be referred to as "oblique visual field"), an image having a sense close to that obtained when a man looks down the vehicle rear obliquely can be displayed on a monitor at a very wide angle of view. In this connection, how the vehicle concerned is to be displayed on the monitor is here considered. In the foregoing vehicle rear monitoring system using a single camera which has already spread widely (a vehicle rear monitoring system wherein an image picked up by a camera is merely reversed right and left without changing a visual point), it is assumed that the rear portion of the vehicle concerned lies on a tower side of the display screen. Therefore, to match this way of display, a method wherein the vehicle concerned is displayed on a lower position of the monitor and the rear of the vehicle is displayed on an upper position of the monitor, is considered preferably because the user does not have a sense of incongruity.

However, in case of monitoring a top visual field as in the vehicle rear monitoring system described in the foregoing publication '952, it is ordinary to display the vehicle concerned on an upper position of the monitor and to display the vehicle rear on a lower position of the monitor because the user is easy intuitively to understand and so on.

For example, therefore, in the case where a monitor display of a top visual field and that of an oblique visual field can be switched from one to the other, or where a monitor display of a top visual field and that of an image picked up by a single camera can be switched from one to the other, and if the position of the vehicle concerned is switched automatically to the upper or lower side in accordance with the display screen, it becomes no longer possible for the user to judge a correlation between the image before and the image after the switching the monitor display, and thus the monitor system is made less significant.

On the other hand, for preventing such confusion of the user, it may be effective to fix the vehicle position to either the upper or the lower side of the monitor irrespective of the display mode on the screen. By so doing, however, there is a fear that the user may have a sense of incongruity for either of the display screens.

SUMMARY OF THE INVENTION

The present invention has been accomplished in view of the above-mentioned circumstances and it is an object of the invention to provide a vehicle rear monitoring method and system which permit a user to grasp the relative position of the vehicle rear and objects in vicinity of the vehicle rear without having any sense of incongruity where plural display modes on a monitor are provided and switched from one to another, as well as a signal processor used in the vehicle rear monitoring system.

To accomplish the above-mentioned object, in a first aspect of the present invention there is provided a method for monitoring a vehicle rear wherein an image of the rear of a vehicle picked up by a camera mounted on the vehicle is subjected to an image processing and the image after the image processing is displayed on a monitor, characterized by displaying the vehicle on one side of the monitor and displaying the image of the vehicle rear on an opposite side of the monitor, and displaying the vehicle on the opposite side of the monitor and displaying the image of the vehicle rear on the one side of the monitor, and enabling to switch from the one display to the other display on the monitor.

In a second aspect of the present invention there is provided, in combination with the above first aspect, a vehicle rear monitoring method wherein a display method includes displaying the vehicle on an upper position of the monitor and displaying the image of the vehicle rear on a lower position of the monitor, and displaying the vehicle on the lower position of the monitor and displaying the image of the vehicle rear on the upper position of the monitor, and enabling to switch from the one display to the other display on the monitor.

In a third aspect of the present invention there is provided an apparatus for monitoring a vehicle rear wherein an image of the rear of a vehicle picked up by a camera mounted on the vehicle is subjected to an image processing and the image after the image processing is displayed on a monitor, characterized in that the apparatus comprises a display screen of displaying the vehicle on one side of the monitor and displaying the image of the vehicle rear on an opposite side of the monitor, and a display screen of displaying the vehicle on the opposite side of the monitor and displaying the image of the vehicle rear on the one side of the monitor, the display screens are used to switch from one to the other on the monitor.

In a fourth aspect of the present invention there is provided, in combination with the above third aspect, a vehicle rear monitoring apparatus having a display screen of displaying the vehicle on an upper position of the monitor and displaying the image of the vehicle rear on a lower position of the monitor, and a display screen of displaying the vehicle on the lower position of the monitor and displaying the image of the vehicle rear on the upper position of the monitor, and the display screens being used to switch from one to the other on the monitor.

In a fifth aspect of the present invention there is provided a vehicle rear monitoring system including a camera mounted on a vehicle to pick up an image of the rear of the vehicle, a signal processor which receives an output signal from the camera and which performs an image processing for the image picked up by the camera, and a monitor which receives an output signal from the signal processor and which displays the image having been subjected to the image processing in the signal processor, the vehicle rear monitoring system further including an image inverter which sends out an image inversion signal to the signal processor. The signal processor includes a decoder which separates and digitizes the output signal from the camera into digital RGB signals, a data memory which stores digital RGB data obtained by the decoder, a first look-up table memory for storing a first look-up table in which is stored a correlation based on coordinate transformation between the input image from the camera and the output image to the monitor, a second look-up table memory for storing a second look-up table in which is stored a correlation based on coordinate transformation between the input image from the camera and an output image which is in a vertically inverted relation to an output image obtained by reference to the first look-up table, an image controller which selects either the first or the second look-up table in accordance with the image inversion signal provided from the image inverter and which converts the digital RGB data stored in the data memory into output image data by reference to the selected look-up table, and an encoder which encodes a signal of the output image data into an analog signal.

In a sixth aspect of the present invention there is provided a vehicle rear monitoring system including a camera mounted on a vehicle to pick up an image of the rear of the vehicle, a signal processor which receives an output signal from the camera and which performs an image processing for the image picked up by the camera, and a monitor which receives an output signal from the signal processor and which displays the image having been subjected to the image processing in the signal processor, the vehicle rear monitoring system further including a visual field switching device which sends out a visual field switching signal to the signal processor and an image inverter which sends out an image inversion signal to the signal processor. The signal processor includes a decoder which separates and digitizes the output signal from the camera into digital RGB signals, a data memory which stores digital RGB data obtained by the decoder, a third look-up table memory for storing a third look-up table in which is stored a correlation based on coordinate transformation between the input image from the camera and the output image to the monitor, a fourth look-up table memory for storing a fourth look-up table in which is stored a correlation based on coordinate transformation between the input image from the camera and an output image of a different visual point relative to an output image obtained by reference to the third look-up table, an inversion processor which changes the storage contents of the third and fourth look-up tables into contents concerned with an output image which is in a vertically inverted relation to an output image obtained by reference to the third or the fourth look-up table, an image controller which selects either the third or the fourth look-up table in accordance with the visual field switching signal provided from the visual field switching device and which, in accordance with the image inversion signal provided from the image inverter, judges whether the inversion processor is to be operated or not, the image controller converting the digital RGB data stored in the data memory into output image data by reference to the selected look-up table or by reference to the storage contents of the selected look-up table having been changed by the inversion processor, and an encoder which encodes a signal of the output image data into an analog signal.

In a seventh aspect of the present invention there is provided a vehicle rear monitoring system including a camera mounted on a vehicle to pick up an image of the rear of the vehicle, a signal processor which receives an output signal from the camera and which performs an image processing for the image picked up by the camera, and a monitor which receives an output signal from the signal processor and which displays the image having been subjected to the image processing in the signal processor, the vehicle rear monitoring system further including an image inverter which sends out an image inversion signal to the signal processor. The signal processor includes a decoder which separates and digitizes the output signal from the camera into digital RGB signals, a data memory which stores digital RGB data obtained by the decoder, a first look-up table memory for storing a first look-up table in which is stored a correlation based on coordinate transformation between the input image from the camera and the output image to the monitor and is also stored data on a superimposing image to be superimposed on the output image, a second look-up table memory for storing a second look-up table in which is stored a correlation based on coordinate transformation between the input image from the camera and an output image which is in a vertically inverted relation to an output image obtained by reference to the first look-up table and is also stored data on a superimposing image to be superimposed on the output image, an image controller which selects either the first or the second look-up table in accordance with the image inversion signal provided from the image inverter and which converts the digital RGB data stored in the data memory into output image data by reference to the selected look-up table, the image controller causing superimposing image data to be superimposed on the output image data, and an encoder which encodes a signal of the output image data with the superimposing image data superimposed thereon into an analog signal.

In an eighth aspect of the present invention there is provided a vehicle rear monitoring system including a camera mounted on a vehicle to pick up an image of the rear of the vehicle, a signal processor which receives an output signal from the camera and which performs an image processing for the image picked up by the camera, and a monitor which receives an output signal from the signal processor and which displays the image having been subjected to the image processing in the signal processor, the vehicle rear monitoring system further including a visual field switching device which sends out a visual field switching signal to the signal processor, and an image inverter which sends out an image inversion signal to the signal processor. The signal processor includes a decoder which separates and digitizes the output signal from the camera into digital RGB signals, a data memory which stores digital RGB data obtained by the decoder, a third look-up table memory for storing a third look-up table in which is stored a correlation based on coordinate transformation between the input image from the camera and the output image to the monitor and is also stored data on a superimposing image to be superimposed on the output image, a fourth look-up table memory for storing a fourth look-up table in which is stored a correlation based on coordinate transformation between the input image from the camera and an output image of a different visual point relative to an output image obtained by reference to the third look-up table and is also stored data on a superimposing image to be superimposed on the output image, an inversion processor which changes the storage contents of the third and fourth look-up tables into contents concerned with an output image which is in a vertically inverted relation to an output image obtained by reference to the third or the fourth look-up table, an image controller which selects either the third or the fourth look-up table in accordance with the visual field switching signal provided from the visual field switching device and which, in accordance with the image inversion signal provided from the image inverter, judges whether the inversion processor is to be operated or not, the image controller converting the digital RGB data stored in the data memory into output image data by reference to the selected look-up table or by reference to the storage contents of the selected look-up table having been changed by the inversion processor and causing superimposing image data to be superimposed on the output image data, and an encoder which encodes a signal of the output image data with the superimposing image data superimposed thereon into an analog signal.

In a ninth aspect of the present invention there is provided a vehicle rear monitoring system including a camera mounted on a vehicle to pick up an image of the rear of the vehicle, a signal processor which receives an output signal from the camera and which performs an image processing for the image picked up by the camera, and a monitor which receives an output signal from the signal processor and which displays the image having been subjected to the image processing in the signal processor, the vehicle rear monitoring system further including an image inverter which sends out an image inversion signal to the signal processor. The signal processor includes a decoder which separates and digitizes the output signal from the camera into digital RGB signals, a data memory which stores digital RGB data obtained by the decoder, an image controller which converts the digital RGB data stored in the data memory into output image data and which causes superimposing image data to be superimposed on the output image data, and an encoder which encodes a signal of the output image data with the superimposing image data superimposed thereon into an analog signal, the image controller changing a calculation method in accordance with the image inversion signal provided from the image inverter which calculation method is used at the time of converting the digital RGB data into the output image data, and generating as an output image a predetermined image or an image which is in a vertically inverted relation to the predetermined image.

In a tenth aspect of the present invention there is provided a vehicle rear monitoring system including a camera mounted on a vehicle to pick up an image of the rear of the vehicle, a signal processor which receives an output signal from the camera and which performs an image processing for the image picked up by the camera, and a monitor which receives an output signal from the signal processor and which displays the image having been subjected to the image processing in the signal processor, the vehicle rear monitoring system further including a visual field switching device which sends out a visual field switching signal to the signal processor, and an image inverter which sends out an image inversion signal to the signal processor. The signal processor includes a decoder which separates and digitizes the output signal from the camera into digital RGB signals, a data memory which stores digital RGB data obtained from the decoder, an image controller which converts the digital ROB data stored in the data memory into output image data and which causes superimposing image data to be superimposed on the output image data, and an encoder which encodes a signal of the output image data with the superimposing image data superimposed thereon into an analog signal, the image controller changing a calculation method in accordance with the visual field switching signal provided from the visual field switching device and the image inversion signal provided from the image inverter which calculation method is used at the time of converting the digital RGB data into the output image data, further, the image controller selecting a predetermined image or an image of a different visual point relative to the predetermined image in accordance with the visual field switching signal, and generating as an output image the selected image or an image which is in a vertically inverted relation to the selected image in accordance with the image inversion signal.

In an eleventh aspect of the present invention there is provided a signal processor connected to both a camera and a monitor which camera is mounted on a vehicle to pick up an image of the rear of the vehicle, the signal processor performing an image processing for the image picked up and inputted from the camera, and outputting the image after the image processing to the monitor, the signal processor being connected to an image inverter which sends out an image inversion signal and including a decoder which separates and digitizes an input signal from the camera into digital ROB signals, a data memory which stores digital RGB data obtained by the decoder, a first look-up table memory for storing a first look-up table in which is stored a correlation based on coordinate transformation between the input image from the camera and the output image to the monitor, a second look-up table memory for storing a second look-up table in which is stored a correlation based on coordinate transformation between the input image from the camera and an output image which is in a vertically inverted relation to an output image obtained by reference to the first look-up table, an image controller which selects either the first or the second look-up table in accordance with the image inversion signal provided from the image inverter and which converts the digital RGB data stored in the data memory into output image data by reference to the selected look-up table, and an encoder which encodes a signal of the output image data into an analog signal In a twelfth aspect of the present invention there is provided a signal processor connected to both a camera and a monitor which camera is mounted on a vehicle to pick up an image of the rear of the vehicle, the signal processor performing an image processing for the image picked up and inputted from the camera, and outputting the image after the image processing to the monitor, the signal processor being connected to both a visual field switching device which sends out a visual field switching signal and an image inverter which sends out an image inversion signal and including a decoder which separates and digitizes an input signal from the camera into digital RGB signals, a data memory which stores digital RGB data obtained by the decoder, a third look-up table memory for storing a third look-up table in which is stored a correlation based on coordinate transformation between the input image from the camera and the output image to the monitor, a fourth look-up table memory for storing a fourth look-up table in which is stored a correlation based on coordinate transformation between the input image from the camera and an output image of a different visual point relative to an output image obtained by reference to the third look-up table, an inversion processor which changes the storage contents of the third and fourth look-up tables into contents concerned with an output image which is in a vertically inverted relation to an output image obtained by reference to the third or the fourth look-up table, an image controller which selects either the third or the fourth look-up table in accordance with the visual field switching signal provided from the visual field switching device and which, in accordance with the image inversion signal provided from the image inverter, judges whether the inversion processor is to be operated or not, the image controller converting the digital RGB data stored in the data memory into output image data by reference to the selected look-up table or by reference to the storage contents of the selected look-up table having been changed by the inversion processor, and an encoder which encodes a signal of the output image data into an analog signal.

In a thirteenth aspect of the present invention there is provided a signal processor connected to both a camera and a monitor which camera is mounted on a vehicle to pick up an image of the rear of the vehicle, the signal processor performing an image processing for the image picked up and inputted from the camera, and outputting the image after the image processing to the monitor, the signal processor being connected to an image inverter which sends out an image inversion signal and including a decoder which separates and digitizes an input signal from the camera into digital RGB signals, a data memory which stores digital RGB data obtained from the decoder, a first look-up table memory for storing a first look-up table in which is stored a correlation based on coordinate transformation between the input image from the camera and the output image to the monitor and is also stored data on a superimposing image to be superimposed on the output image, a second look-up table memory for storing a second look-up table in which is stored a correlation based on coordinate transformation between the input image from the camera and an output image which is in a vertically inverted relation to an output image obtained by reference to the first look-up table and is also stored data on a superimposing image to be superimposed on the output image, an image controller which selects either the first or the second look-up table in accordance with the image inversion signal provided from the image inverter and which converts the digital RGB data stored in the data memory into output image data by reference to the selected look-up table, the image controller causing superimposing data to be superimposed on the output image data, and an encoder which encodes a signal of the output image data with the superimposing image data superimposed thereon into an analog signal.

In a fourteenth aspect of the present invention there is provided a signal processor connected to both a camera and a monitor which camera is mounted on a vehicle to pick up an image of the rear of the vehicle, the signal processor performing an image processing for the image picked up and inputted from the camera, and outputting the image after the image processing to the monitor, the signal processor being connected to both a visual field switching device which sends out a visual field switching signal and an image inverter which sends out an image inversion signal and including a decoder which separates and digitizes an input signal from the camera into digital RGB signals, a data memory which stores digital RGB data obtained by the decoder, a third look-up table memory for storing a third look-up table in which is stored a correlation based on coordinate transformation between the input image from the camera and the output image to the monitor and is also stored data on a superimposing image to he superimposed on the output image, a fourth look-up table memory for storing a fourth look-up table in which is stored a correlation based on coordinate transformation between the input image from the camera and an output image of a different visual point relative to an output image obtained by reference to the third look-up table and is also stored data on a superimposing image to be superimposed on the output image, an inversion processor which changes the storage contents of the third and fourth look-up tables into contents concerned with an output image which is in a vertically inverted relation to an output image obtained by reference to the third or the fourth look-up table, an image controller which selects either the third or the fourth look-up table in accordance with the visual field switching signal provided from the visual field switching device and which, in accordance with the image inversion signal provided from the image inverter, judges whether the inversion processor is to be operated or not, the image controller converting the digital RGB data stored in the data memory into output image data by reference to the selected look-up table or by reference to the storage contents of the selected look-up table having been changed by the inversion processor and causing superimposing image data to be superimposed on the output image data, and an encoder which encodes a signal of the output image data with the superimposing image data superimposed thereon into an analog signal.

In a fifteenth aspect of the present invention there is provided a signal processor connected to both a camera and a monitor which camera is mounted on a vehicle to pick up an image of the rear of the vehicle, the signal processor performing an image processing for the image picked up and inputted from the camera, and outputting the image after the image processing to the monitor, the signal processor being connected to an image inverter which sends out an image inversion signal and including a decoder which separates and digitizes an input signal from the camera into digital RGB signals, a data memory which stores digital RGB data obtained by the decoder, an image controller which converts the digital RGB data stored in the data memory into output image data and which causes superimposing image data to be superimposed on the output image data, and an encoder which encodes a signal of the output image data with the superimposing image data superimposed thereon into an analog signal. The image controller changes a calculation method in accordance with the image inversion signal provided from the image inverter which calculation method is used at the time of converting the digital RGB data into the output image data, and generates as an output image a predetermined image or an image which is in a vertically inverted relation to the predetermined image.

In a sixteenth aspect of the present invention there is provided a signal processor connected to both a camera and a monitor which camera is mounted on a vehicle to pick up an image of the rear of the vehicle, the signal processor performing an image processing for the image picked up and inputted from the camera, and outputting the image after the image processing to the monitor, the signal processor being connected to both a visual field switching device which sends out a visual field switching signal and an image inverter which sends out an image inversion signal and including a decoder which separates and digitizes an input signal from the camera into digital RGB signals, a data memory which stores digital ROB data obtained by the decoder, an image controller which converts the digital RGB data stored in the data memory into output image data and which causes superimposing image data to be superimposed on the output image data, and an encoder which encodes a signal of the output image data with the superimposing image data superimposed thereon into an analog signal. The image controller changes a calculation method in accordance with the visual field switching signal provided from the visual field switching device and the image inversion signal provided from the image inverter which calculation method is used at the time of converting the digital RGB data into the output image data. Further, the image controller selects a predetermined image or an image of a different visual point relative to the predetermined image in accordance with the visual field switching signal and generates as an output image the selected image or an image which is in a vertically inverted relation to the selected image in accordance with the image inversion signal.

DETAILED DESCRIPTION OF PREFERRED EMBODIMENTS

First Embodiment

Figure 1:
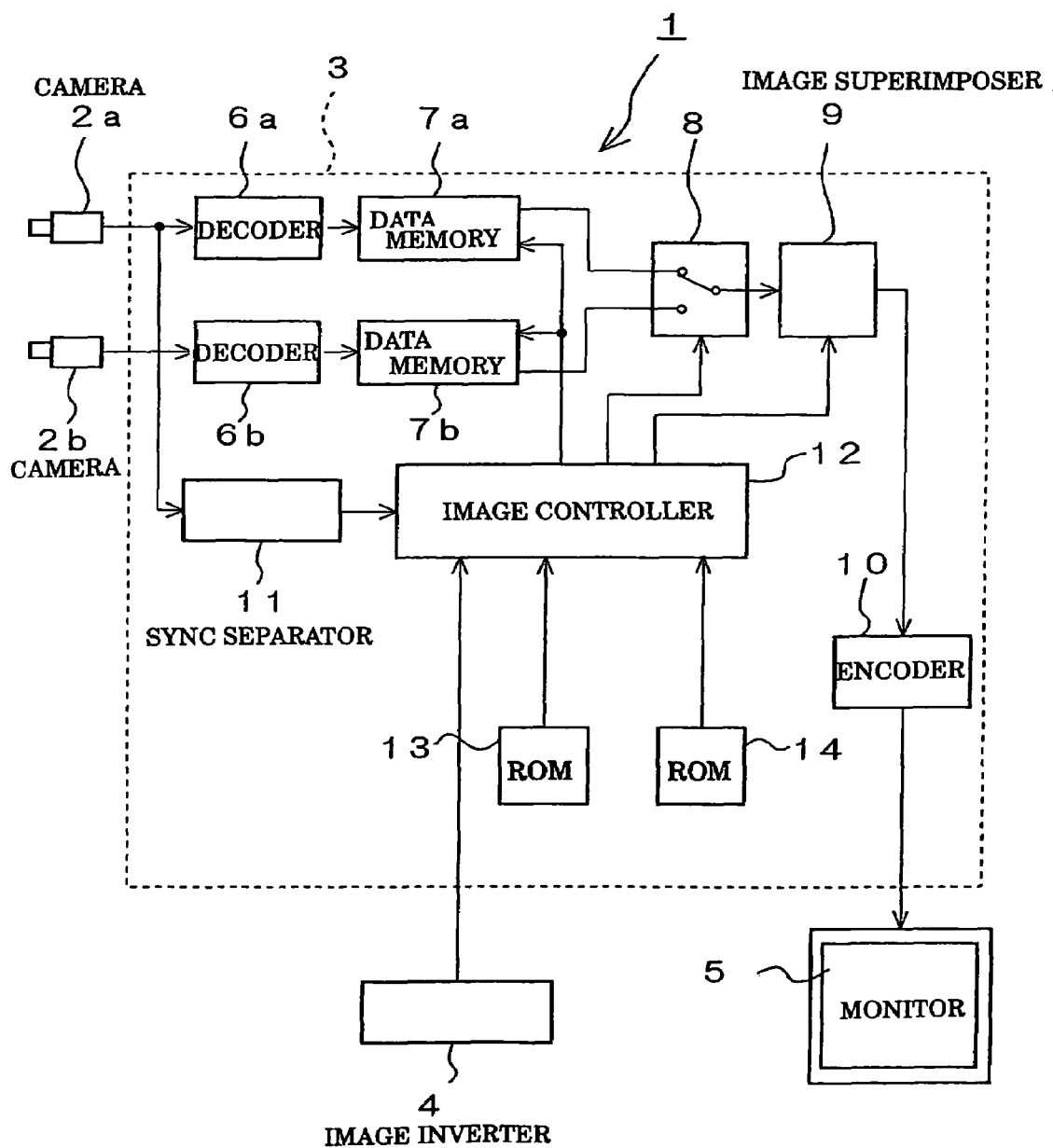
FIG. 1 is a system block diagram showing a schematic construction of a vehicle rear monitoring system according to a first embodiment of the present invention.

In FIG. 1 is shown a schematic construction of a vehicle rear monitoring system according to a first embodiment of the present invention, This vehicle rear monitoring system, indicated at 1, is provided with cameras 2a and 2b mounted in a rear portion of a vehicle (not shown), an image synthesizer 3 as a signal processor, an image inverter 4 which is constituted, for example, by a switch installed within a vehicle compartment of the vehicle and which sends out an image inversion signal to the image synthesizer 3 in accordance with operation performed by a user, and a monitor 5 mounted, for example, on an instrument panel within the vehicle compartment.

The image synthesizer 3 is provided with a decoder 6a connected to the camera 2a, a data memory 7a connected to the decoder 6a, a decoder 6b connected to the camera 2b, a data memory 7b connected to the decoder 6b, an input image selector 8 connected to both data memories 7a and 7b, an image super-imposer 9 connected to the input image selector 8, and an encoder 10 connected to the image super-imposer 9.

The image synthesizer 3 is further provided with a SYNC separator 11, an image controller 12, a ROM 13 as a first look-up table memory, and a ROM 14 as a second look-up table memory. The image inverter 4 is connected to the image controller 12, and the monitor 5 is connected to the encoder 10.

The decoders 6a and 6b function as decoders and A/D converters and decode and digitize NTSC signals or PAL signals inputted from the cameras 2a and 2b into digital RGB signals.

The data memories 7a and 7b store digital RGB data obtained by the decoders 6a and 6b.

The input image selector 8 transmits data stored in either the data memory 7a or 7b to the image super-imposer 9 selectively, which in turn replaces the data from the data memory 7a or 7b with color data as necessary, On this regard, a description will be given later.

The encoder 10, which functions as both D/A converter and encoder, converts data provided from the image super-imposer 9 into an analog signal and encodes the resulting RGB signals into NTSC signal or PAL signal.

The SYNC separator 11 separates a synchronizing signal from an output signal of the camera 2a, which synchronizing signal is inputted to the image controller 12.

First and second look-up tables are stored in the ROMs 13 and 14, respectively. In each look-up table is stored in advance pixel data of which picked-up image from the camera 2a or 2b and of which coordinates $(X_i, Y_i)$ is to be used (a correlation based on coordinate transformation between input images from the cameras 2a and 2b and an output image to the monitor 5) with respect to coordinates $(X_0, Y_0)$ of the output image to the monitor 5 (X stands for a coordinate value in the horizontal direction and Y stands for a coordinate value in the vertical direction, as is the case with the following), or superimposing image data (e.g., data on superimposing place and color) is stored in advance which is necessary for superimposing an image of the vehicle concerned on the output image. Particularly, in the second look-up table are stored correlations between input images from the cameras 2a, 2b and output images which are in a vertically inverted relation to output images obtained by reference to the first look-up table. If coordinates of an output image obtained from the first look-up table are $(X_0, Y_0)$, coordinates of an output image obtained from the second look-up table are $(X_0', Y_0')$, a horizontal resolution of each output image is a, and a vertical resolution thereof is b, then the following equations are established between $X_0, Y_0$ and $X_0', Y_0'$:

$$X_0'=a-X_0 \quad Y_0'=b-Y_0 \tag{1}$$

Figure 2A:
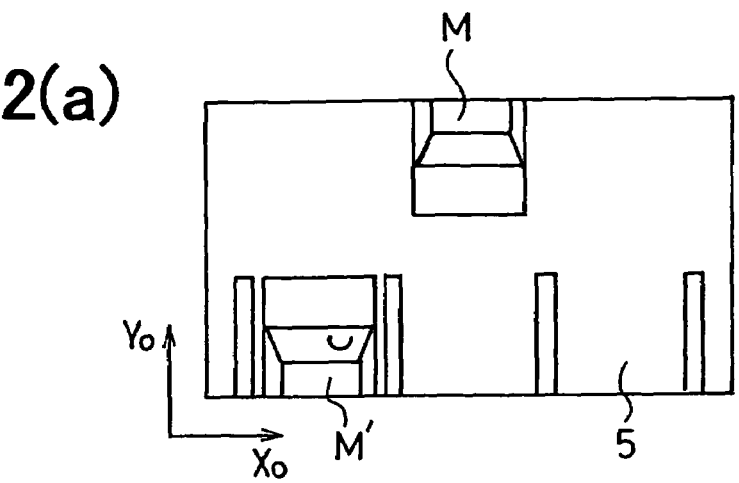
FIG. 2 is an explanatory diagram showing output images based on a top visual field, in which (a) is of a case where the vehicle concerned is displayed on an upper side and (b) is of a case where the vehicle concerned is displayed on a lower side.

Although coordinate values are here represented in terms of two-dimensional coordinates, address values in memory space are actually used. By incorporating parameters such as mounting positions of the cameras 2a and 2b as necessary into the look-up tables it is possible to cope with various output images (the parameters can be used in generating images as seen from various virtual visual points), but in this embodiment, according to the first look-up table there is obtained a top visual field in which the vehicle M concerned is displayed on an upper side of the screen of the monitor 5 (see FIG. 2(a), M' in the figure represents another vehicle located behind the vehicle M concerned), while according to the second look-up table there is obtained a top visual field in which the vehicle M concerned is displayed on a lower side of the screen of the monitor 5 (see FIG. 2(b)).

The image controller 12 selects either the first or the second look-up table in accordance with an image inversion signal provided from the image inverter 4 and makes reference to the selected look-up table. Then, for each coordinates $(X_0, Y_0)$ of an output image the image controller 12 instructs the input image selector 8 in which of data memories 7a and 7b the data to be used is stored, instructs the data memories 7a and 7b which address (coordinates $(X_i, Y_i)$) of data is to be used, and further instructs the image super-imposer 9 what color development is to be made in case of displaying a superimposing image at the coordinates $(X_0, Y_0)$, causing digital RGB data stored in the data memories 7a and 7b to be converted to output image data and causing superimposing image data to be superimposed on the output image data.

Through these operations of the image controller 12, data of any address in the data memories 7a and 7b or color data generated by the image super-imposer 9 is transmitted to the encoder 10 for each coordinates $(X_0, Y_0)$ and the output image is displayed on the monitor 5.

In the vehicle rear monitoring system 1 of this embodiment, an image inversion signal is provided by the image inverter 13 in accordance with the user's will and the look-up table referred to by the image controller 21 is switched, further, the position of the vehicle M concerned which is displayed on the monitor 5 is switched to the upper or the lower side to match the sense of the user, and thus the user can grasp the position of the vehicle concerned easily without a sense of incongruity.

Second Embodiment

Figure 3:
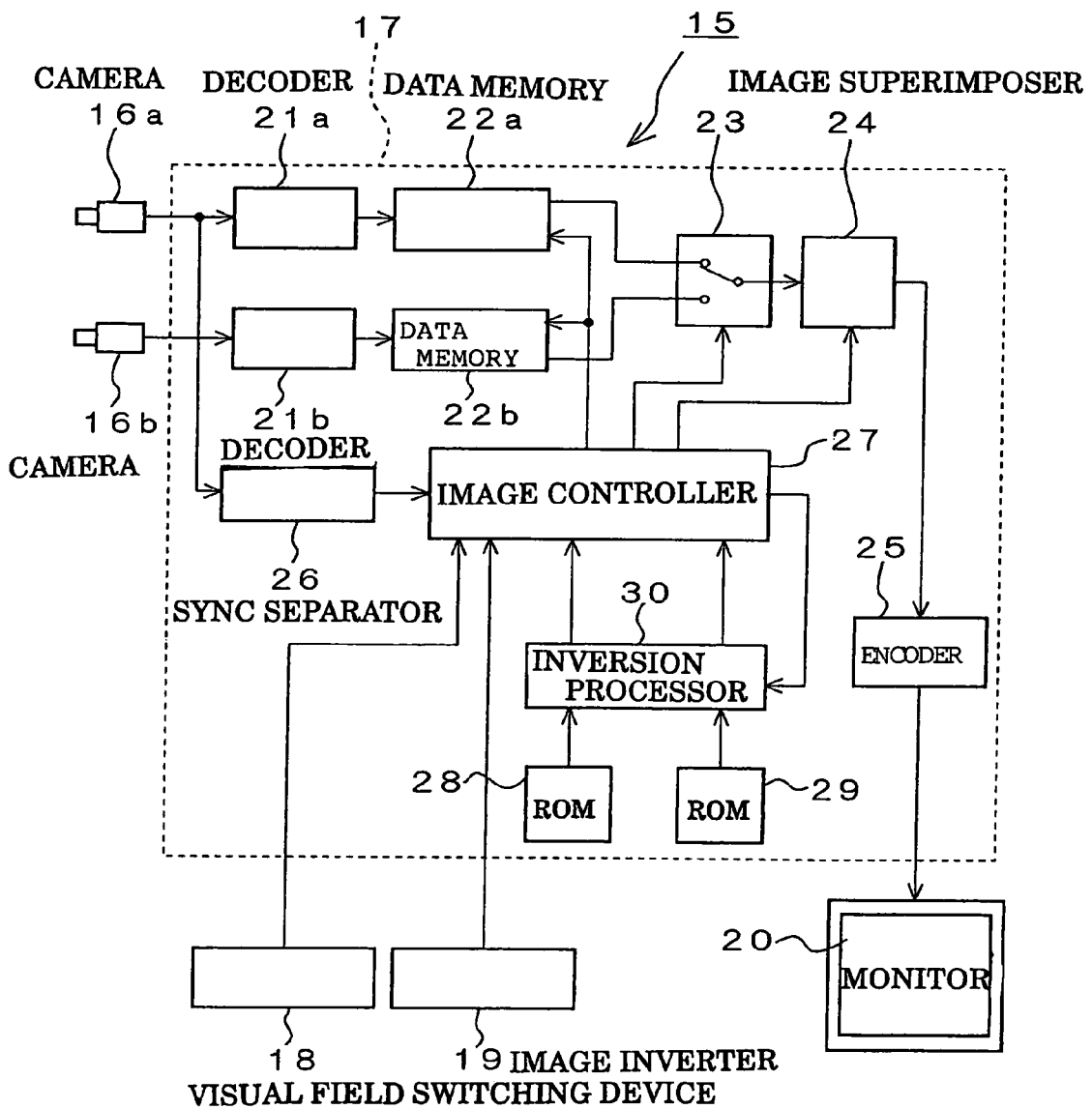
FIG. 3 is a system block diagram showing a schematic construction of a vehicle rear monitoring system according to a second embodiment of the present invention.

FIG. 3 illustrates a schematic construction of a vehicle rear monitoring system according to a second embodiment of the present invention. This vehicle rear monitoring system, indicated at 15, is provided with cameras 16a and 16b mounted in a rear portion of a vehicle (not shown), an image synthesizer 17 as a signal processor, a visual field switching device 18 which is constituted, for example, by a switch installed within a vehicle compartment of the vehicle and which sends out a visual field switching signal to the image synthesizer 17 in accordance with operation performed by a user, an image inverter 19 which sends out an image inversion signal to the image synthesizer 17 also in accordance with operation performed by the user, and a monitor 20 mounted, for example, on an instrument panel within the vehicle compartment.

The image synthesizer 17 is provided with a decoder 21a connected to the camera 16a, a data memory 22a connected to the decoder 21a, a decoder 21b connected to the camera 16b, a data memory 22b connected to the decoder 21b, an input image selector 23 connected to the data memories 22a and 22b, an image super-imposer 24 connected to the input image selector 23, and an encoder 25 connected to the image super-imposer 24.

The image synthesizer 17 is further provided with a SYNC separator 26, an image controller 27, a ROM 28 as a third look-up table memory, a ROM 29 as a fourth look-up table memory, and an inversion processor 30. The visual field switching device 18 and the image inverter 19 are connected to the image controller 27, and the monitor 20 is connected to the encoder 25.

The decoders 21a and 21b, which function as decoders and A/D converters, decode and digitize NTSC signals or PAL signals inputted from the cameras 16a and 17b into digital RGB signals.

The data memories 22a and 22b store digital RGB data obtained by the decoders 21a and 21b.

The input image selector 23 transmits data stored in either the data memory 22a or 22b to the image super-imposer 24 selectively, which in turn replaces the data from the data memory 22a or 22b with color data as necessary. But reference to this point will be made later.

The encoder 25, which functions as both D/A converter and encoder, converts data provided from the image super-imposer 24 into an analog signal and encodes the resulting RGB signals into NTSC signal or PAL signal.

The SYNC separator 26 separates a synchronizing signal from an output signal of the camera 16a, which synchronizing signal is inputted to the image controller 27.

Third and fourth look-up tables are stored in the ROMs 28 and 29, respectively. In each look-up table is stored in advance pixel data of which picked-up image from the camera 16a or 16b and of which coordinates $(X_i, Y_i)$ is to be used with respect to coordinates $(X_0, Y_0)$ of the output image to the monitor 20, or superimposing image data is stored in advance which is necessary for superimposing an image of the vehicle concerned on the output image. Particularly, in the fourth look-up table are stored correlations between input images from the cameras 16a, 16b and output images of a different visual point relative to output images obtained by reference to the third look-up table.

Figure 2B:
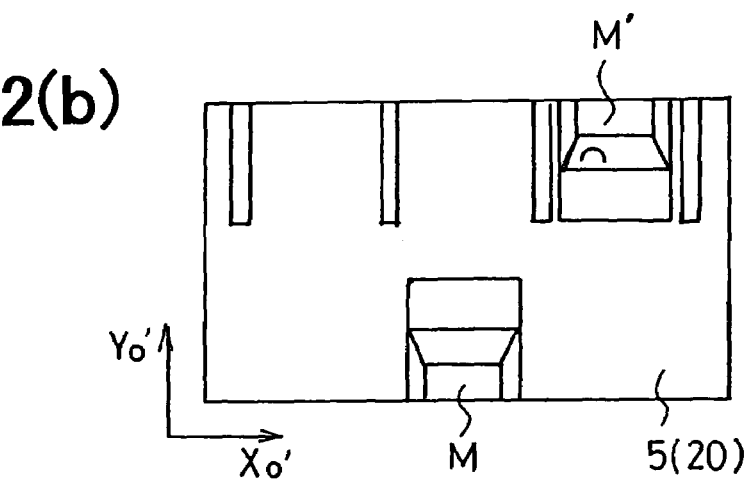
Figure 4:
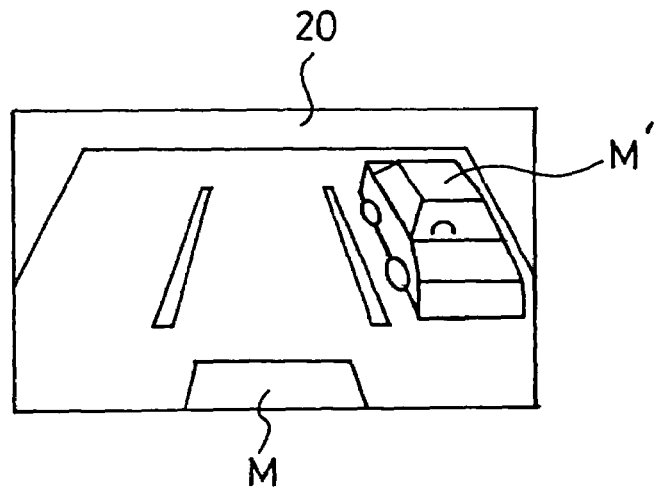
FIG. 4 is an explanatory diagram showing an output image based on an oblique visual field.

By incorporating parameters such as mounting positions of the cameras 16a and 16b as necessary into the look-up tables it is possible to cope with various output images, but in this embodiment, according to the third look-up table there is obtained a top visual field in which the vehicle M concerned is displayed on the lower side (or upper side) of the screen of the monitor 5 (see FIG. 2(b)), while according to the fourth look-up table there is obtained an oblique visual field in which the vehicle M concerned is displayed on the lower side (or upper side) of the screen of the monitor 5 (see FIG. 4).

The inversion processor 30 changes the storage contents of the third and fourth look-up tables into contents concerned with an output image which is in a vertically inverted relation to an output image obtained by reference to the third or the fourth look-up table. That is, given that coordinates of the output image from the third or the fourth look-up table arc $(X_0, Y_0)$, coordinates of an output image obtained upon operation of the inversion processor 30 relative to the coordinates $(X_0, Y_0)$ are $(X_0'', Y_0'')$, a horizontal resolution of each output image is c, and a vertical resolution thereof is d, the following equations are established between $X_0, Y_0$ and $X_0''$, $Y_0''$:

$$X_0''=c-X_0 \quad Y_0''=d-Y_0 \qquad (2)$$

In accordance with the visual field switching signal provided from the visual field switching device 18 the image controller 27 selects either the third or the fourth look-up table, and in accordance with the image inversion signal provided from the image inverter 19 the image controller 27 judges whether the inversion processor 30 is to be operated or not, and makes reference to the selected look-up table or the storage contents of the selected look-up table having been changed by the inversion processor 30. Then, for each coordinates $(X_0, Y_0)$ of an output image the image controller 27 instructs the input image selector 23 in which of data memories 22a and 22b the data to be used is stored, instructs the data memories 22a and 22b which address of data is to be used, and further instructs the image super-imposer 24 what color development is to be made in case of displaying a superimposing image at the coordinates $(X_0, Y_0)$, causing digital RGB data stored in the data memories 22a and 22b to be converted into output image data and causing superimposing image data to be superimposed on the output image data.

Through these operations of the image controller 27, data of any address in the data memories 22a and 22b or color data generated by the image super-imposer 24 is transmitted to the encoder 25 for each coordinates $(X_0, Y_0)$ and the output image is displayed on the monitor 20.

In the vehicle rear monitoring system 15 of this embodiment, a visual field switching signal and an image inversion signal are provided by the visual field switching device 18 and the image inverter 19 in accordance with the user's will and the look-up table referred to by the image controller 27, as well as ON-OFF of the inversion processor 30, are switched, whereby the position of the vehicle M concerned, which is displayed on the monitor 20, is switched to the upper or the lower side to match the sense of the user. Thus, even if plural image display modes on the monitor are provided, the user can grasp the position of the vehicle concerned easily without a sense of incongruity.

With use of the inversion processor 30 constructed as above, two output images which are in a vertically inverted relation to each other can be derived from one look-up table. Therefore, particularly in a vehicle rear monitoring system having a lot of image display modes, it is possible to save the memory capacity.

Although in each of the above embodiments two types of look-up tables are provided and one (top visual field) or two (top visual field and oblique visual field) positions of virtual visual points are provided, a large number of output image patterns may be provided by using additional ROMS for storing look-up tables.

Although in the above embodiment correlations based on coordinate transformation between input and output images, as well as superimposing image data, are together stored in a single look-up table, the superimposing image data may be stored separately from the look-up table in which are stored correlations based on coordinate transformation. By so doing, it is possible to provide plural superimposing image patterns independently of the number of visual point conversion patterns, and by providing a superimposing image selector for the user to select a superimposing image it becomes possible to select a superimposing image pattern independently of a visual point conversion pattern.

Further, although in each of the above embodiments image conversion is performed using a look-up table, the image controllers 12 and 27 may be endowed with a calculating function and there may be provided means for imparting a parameter of a virtual visual point position to the image controllers 12 and 27, thereby allowing the image controllers 12 and 27 to make calculation in real time and perform image conversion. In this case, a superimposing image such as the vehicle concerned is also subjected to calculation and transformation as necessary in accordance with the parameter of a virtual visual point position. In the case where the image controllers 12 and 27 are endowed with such a calculating function, it is optional whether the vertical inversion of the output image is to be conducted by calculation or by using such an inversion processor 30 as described in the second embodiment.

Although in the above embodiments there are used two cameras for photographing the vehicle rear, the number of camera may be one or three or more.

Since the present invention is constructed as above, there is obtained an effect such that even where plural display modes for the monitor screen are provided, the user can grasp the position of the vehicle concerned easily without a sense of incongruity.

What is claimed is:

1. A method for monitoring a vehicle rear wherein an image of a rear of a vehicle picked up by one or more cameras mounted on the vehicle and an image of objects in a vicinity of said vehicle rear picked up by the one or more cameras are subjected to an image processing and the multiple images after the image processing are displayed in real time on a single monitor, the method comprising:

providing one of a first and second display on a single monitor, wherein the first display is an image of said vehicle rear on one side of said single monitor and an image of objects in the vicinity of said vehicle rear on the other side of said single monitor, and the second display is an inverted image of the first display; and enabling changing from the first display to the second display on said single monitor, wherein the first display includes displaying said vehicle rear on an upper position of said monitor and displaying the image of objects in the vicinity of said vehicle rear on a lower position of said monitor, and wherein the second display includes displaying said vehicle rear on the lower position of said monitor and displaying the image of objects in the vicinity of said vehicle rear on the upper position of said monitor.

2. A method for monitoring a vehicle rear as in claim 1, wherein the first and second displays are displayed in an oblique visual field.

3. An apparatus for monitoring a vehicle rear wherein an image of a rear of a vehicle picked up by one or more cameras mounted on the vehicle and an image of objects in a vicinity of said vehicle rear picked up by the one or more cameras mounted on the vehicle are subjected to an image processing and the images after the image processing are displayed in real time on a single monitor, the apparatus comprising:

a single monitor displaying one of a first and second display, wherein the first display is an image of said vehicle rear on one side of said single monitor and an image of objects in the vicinity of said vehicle rear on the other side of said single monitor, and the second display is an inverted image of the first display, the first display and the second display being changeable on said single monitor, wherein the first display screen is configured to display said vehicle rear on an upper position of said monitor and display the image of objects in a vicinity of said vehicle rear on a lower position of said monitor, and wherein the second display screen is configured to display said vehicle rear on the lower position of said monitor and display the image of objects in the vicinity of said vehicle rear on the upper position of said monitor.

4. An apparatus for monitoring a vehicle rear as in claim 3, wherein the first and second displays are displayed in an oblique visual field.

* * * * *